United States Patent
Komatsu et al.

(10) Patent No.: US 9,518,140 B2
(45) Date of Patent: Dec. 13, 2016

(54) PROCESS FOR PRODUCTION OF FLUORINE-CONTAINING BLOCK COPOLYMER

(71) Applicant: DAIKIN INDUSTRIES, LTD., Osaka (JP)

(72) Inventors: Yuzo Komatsu, Settsu (JP); Kenichi Katsukawa, Settsu (JP); Haruhiko Mohri, Settsu (JP); Takashi Kanemura, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/041,285

(22) Filed: Feb. 11, 2016

(65) Prior Publication Data

US 2016/0159961 A1    Jun. 9, 2016

Related U.S. Application Data

(63) Continuation of application No. 14/810,577, filed on Jul. 28, 2015, now Pat. No. 9,290,628, which is a continuation of application No. 13/384,115, filed as application No. PCT/JP2010/062049 on Jul. 16, 2010, now Pat. No. 9,127,111.

(30) Foreign Application Priority Data

Jul. 16, 2009  (JP) ................. 2009-167817

(51) Int. Cl.
| | |
|---|---|
| *C08F 214/22* | (2006.01) |
| *C08F 293/00* | (2006.01) |
| *C08J 3/24* | (2006.01) |
| *C08F 259/08* | (2006.01) |
| *C08F 214/26* | (2006.01) |

(52) U.S. Cl.
CPC ......... *C08F 293/005* (2013.01); *C08F 259/08* (2013.01); *C08F 293/00* (2013.01); *C08J 3/24* (2013.01); *C08F 214/22* (2013.01); *C08F 214/262* (2013.01); *C08J 2327/22* (2013.01)

(58) Field of Classification Search
CPC ... C08F 293/00; C08F 214/22; C08F 214/262; C08F 214/28; C08F 259/08
See application file for complete search history.

(56) References Cited

U.S. PATENT DOCUMENTS

| | | | |
|---|---|---|---|
| 4,000,356 A | 12/1976 | Weisgerber et al. | |
| 4,158,678 A | 6/1979 | Tatemoto et al. | |
| 4,201,848 A | 5/1980 | Kotani et al. | |
| 4,861,836 A | 8/1989 | Tatemoto et al. | |
| 4,962,236 A | 10/1990 | Tatemoto et al. | |
| 5,198,136 A | 3/1993 | Tatemoto et al. | |
| 5,314,958 A | 5/1994 | Himori | |
| 9,127,111 B2 | 9/2015 | Komatsu et al. | |
| 2005/0131186 A1 | 6/2005 | Percec et al. | |
| 2010/0292408 A1 | 11/2010 | Komatsu et al. | |

FOREIGN PATENT DOCUMENTS

| | | |
|---|---|---|
| JP | 58-4728 A | 1/1983 |
| JP | 62-24446 B | 5/1987 |
| JP | 04-348115 A | 12/1992 |
| JP | 08-059762 A | 3/1996 |
| WO | 2008/155324 A1 | 12/2008 |

OTHER PUBLICATIONS

Coelho et al., "Synthesis of Poly(ethyl acrylate) by Single Electron Transfer-Degenerative Chain Transfer Living Radical Polymerization in Water Catalyzed by $Na_2S_2O_4$," Journal of Polymer Science Part A: Polymer Chemistry, vol. 46, pp. 421-432, 2008.

Coelho et al., "Synthesis of Poly(vinyl chloride)-b-Poly(n-butyl acrylate)-b-Poly(vinyl chloride) by the Competitive Single-Electron-Transfer/Degenerative-Chain-Transfer-Mediated Living Radical Polymerization in Water," Journal of Polymer Science: Part A: Polymer Chemistry, vol. 44, pp. 3001-3008, 2006.

Extended European Search Report for EP Appln. No. 10799920.3 issued on Nov. 26, 2013.

Manseri et al., "Synthesis of fluorinated telomers. Part 4. Telomerization of vinylidene fluoride with commercially available α,ω-diiodoperfluoroalkanes", Journal of Fluorine Chemistry, 1995, vol. 74, pp. 59-67.

Percec et al., "Synthesis of Poly(vinyl chloride)-b-Poly(2-ethylhexyl acrylate)-b-Poly(vinyl Chloride) by the Competitive Single-Electron-Transfer/Degenerative-Chain-Transfer Mediated Living Radical Polymerization of Vinyl Chloride Initiated from α,ω-Di(iodo) poly(2-ethylhexyl acrylate) and Catalyzed with Sodium Dithionite in Water," Journal of Polymer Science: Part A: Polymer Chemistry, vol. 43, pp. 2276-2280, 2005.

*Primary Examiner* — Mark Kaucher

(74) *Attorney, Agent, or Firm* — Sughrue Mion, PLLC

(57) ABSTRACT

Provided is a process for the production of a fluorine-containing block copolymer, which suppresses the formation of a homopolymer as a by-product and which, regardless of whether the chain transfer constant of the iodine end is large or small, achieves nearly 100% conversion into a block copolymer. The process is characterized by reacting (A) a fluorine-containing polymer which has an iodine atom or a bromine atom at either or both terminals of the backbone chain and/or at a side-chain terminal with (M) a radical-polymerizable monomer in the presence of (C) a sulfur compound represented by general formula (2): $(Y^1)_n H_{2-n} S_2 O_4$ (wherein $Y^1$ is a mono- or divalent metal ion or an ammonium ion; and n is an integer of 0 to 2).

4 Claims, No Drawings

PROCESS FOR PRODUCTION OF FLUORINE-CONTAINING BLOCK COPOLYMER

CROSS REFERENCE TO RELATED APPLICATIONS

The present application is a Continuation of U.S. patent application Ser. No. 14/810,577 (now allowed) filed Jul. 28, 2015, which is a Continuation of U.S. patent application Ser. No. 13/384,115 (now U.S. Pat. No. 9,127,111) filed Jan. 13, 2012, which is a National Stage Application of PCT/JP2010/062049 filed Jul. 16, 2010, which claims the benefit of Japanese Patent Application No. 2009-167817 filed Jul. 16, 2009. The entire disclosures of the prior applications are hereby incorporated by reference.

TECHNICAL FIELD

The present invention relates to a novel method for producing a fluorine-containing block copolymer in which by-production of homopolymers is prevented and a formation yield of block copolymer is greatly improved.

BACKGROUND ART

Fluorine-containing block copolymers are widely used in various fields because they can impart various characteristics.

Disclosed as one method for producing such fluorine-containing block copolymers is a method in which iodine-transfer polymerization is performed on a fluoropolymer having an iodine atom at its end, thereby forming a block of different polymer segments (Patent Documents 1 to 3).
   Patent Document 1: JP 58-4728 B
   Patent Document 2: JP 62-24446 B
   Patent Document 3: JP 8-59762 A

SUMMARY OF THE INVENTION

Problems to be Solved by the Invention

Production of block copolymers by conventionally known iodine-transfer polymerization is based on a polymerization reaction of monomers (M) in the presence of a compound having a —$CF_2I$ end which has a high chain-transfer constant, and its reaction mechanism is the same as that in generally known radical telomerization.

The polymerization reaction formula wherein ammonium persulfate is used as a radical initiator as one example of the iodine-transfer polymerization is represented as follows.
(1-1) Initiation

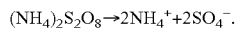

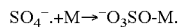

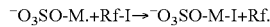

(2-1) Propagation

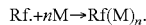

(3-1) Termination

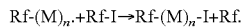

One feature of this iodine-transfer polymerization is that $^-O_3SO\text{-}M\cdot$ generated in Initiation (1-1) causes another polymerization reaction and a homopolymer of the monomers (M) is disadvantageously by-produced, in the case that the chain-transfer constant of the iodine-terminated polymer (Rf-I) is low. The document "Macromolecules" (2006, 25, 8639) gives a comparison between styrene block copolymerizability of a compound having a —$CF_2I$ end and that of a compound having a —$CH_2I$ end. The document mentions that the compound having a —$CH_2I$ end has a chain-transfer constant of about 0, and thus styrene is homopolymerized due to a radical initiator used for activation of an iodine end. This by-production of a homopolymer may more or less occur even in the case that the chain-transfer constant of the iodine-terminated polymer (Rf-I) is high.

As mentioned above, by-production of a homopolymer of monomers for copolymerization is unavoidable in the production of fluorine-containing block copolymers by conventional iodine-transfer polymerization. Further, use of iodine-terminated polymers with a low chain-transfer constant is difficult.

The present inventors have found that use of a specific sulfur compound which serves as a one-electron reducing agent instead of a radical polymerization initiator surprisingly leads to suppression of by-production of a homopolymer and proceeding of block copolymerization at a probability of almost 100% regardless of the value of the chain-transfer constant of an iodine end. Thereby, the present inventors have completed the present invention.

As a result, an object of the present invention is to provide a method for producing a fluorine-containing block copolymer, which can suppress by-production of a homopolymer and can lead to blocking at a probability of almost 100% regardless of the value of the chain-transfer constant of an iodine end.

Means for Solving the Problems

The present invention relates to a method for producing a fluorine-containing block copolymer, comprising reacting a fluoropolymer (A) having an iodine atom or a bromine atom at either or both ends of its main chain and/or an end of its side chain with a radical polymerizable monomer (M) in the presence of a sulfur compound (C) represented by formula (2):

wherein $Y^1$ is a monovalent or divalent metal ion or an ammonium ion, and n is an integer of 0 to 2.

Effects of the Invention

The present invention can provide a method for producing a fluorine-containing block copolymer, which can suppress by-production of a homopolymer and can lead to blocking at a probability of almost 100% regardless of the value of the chain-transfer constant of an iodine end.

MODES FOR CARRYING OUT THE INVENTION

First, the following will describe the block copolymerization reaction occurring in the production method of the present invention wherein a dithionite is used as the sulfur compound (C), in comparison with the above conventional iodine-transfer polymerization.
(1-2) Initiation

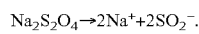

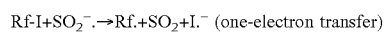

(2-2) Propagation

Rf.+nM→Rf-(M)ⁿ.

(3-2) Termination

Rf-(M)ₙ.+Rf-I→Rf-(M)ₙ-I+Rf.

In other words, an $SO_2$ radical anion, which is a strong reducing agent generated in the initiation, one-electron-reduces Rf-I to generate an Rf radical, and thereafter block copolymerization of the monomers (M) proceeds. Unlike iodine-transfer polymerization, this reducing reaction can be applied to not only a compound having a —$CF_2I$ end which has a high chain-transfer constant but also a compound having a —$CH_2I$ end which has an extremely low chain-transfer constant regardless of the value of the chain-transfer constant. Thus, the reducing reaction can be applied to multiple purposes. Further, an $SO_2$ anion radical does not attaches to the monomer (M). Thus, it does not serve as an initiation point of polymerization, and as a result homopolymerization is less likely to occur. In addition, the reaction is not affected even by an aqueous solvent, so that it can be advantageously applied to various reaction systems.

The fluoropolymer (A) used as a starting material in the production method of the present invention has an iodine atom or a bromine atom at either or both ends of its main chain and/or an end of its side chain.

For example, the terminal structure having an iodine atom or a bromine atom is preferably a terminal structure represented by formula (1):

$$—CR^1R^2—X^1 \quad (1)$$

(wherein $R^1$ and $R^2$ are the same as or different from each other, and they each are a hydrogen atom, fluorine atom, chlorine atom, or $CF_3(CF_2)_n$— (n is an integer of 0 to 10); $X^1$ is a bromine atom or iodine atom) because of good reactivity of an end group and easy synthesis of a material polymer.

Specific examples thereof include —$CH_2I$, —$CH_2Br$, —$CF_2I$, —$CF_2Br$, —CFClI, —CFClBr, —$CF(CF_3)I$, and —$CF(CF_3)Br$.

Examples of the method for producing a fluoropolymer having the end group of formula (1) include known iodine-transfer polymerization, and decarboxylative iodination on a fluoropolymer having a carboxylate at its end, disclosed in JP 63-159336 A.

The structure of the fluoropolymer (A) excluding both end groups is not particularly limited as long as it includes a structural unit derived from the fluoromonomer (N).

In the case of an addition-polymerized (e.g. radical-polymerized) fluoropolymer (A), examples of the fluoromonomer (N) include vinyl fluoride monomers, fluoro(meth)acrylic monomers, and fluorostyrenic monomers.

The vinyl fluoride monomer may include one of or two or more of the following compounds, for example: fluoroolefinic monomers such as tetrafluoroethylene (TFE), chlorotrifluoroethylene (CTFE), trifluoroethylene (TrFE), hexafluoropropylene(HFP), vinylidene fluoride (VdF), $CH_2$=CHF (VF), and $CH_2$=$CFCF_3$; fluorovinyl etheric monomers such as perfluorobutenyl vinyl ether, perfluoroallyl vinyl ether, perfluoro-2,2-dimethyldioxole, perfluorodioxole, and $CF_2$=$CFO(CF_2)_nF$ (n is an integer of 1 to 10); and fluoroallyl etheric monomers such as $CH_2$=$CFCF_2O[CF(CF_3)CF_2]_nOCF(CF_3)COOR$ (n is an integer of 0 to 10; and R is a hydrogen atom or an alkyl group optionally substituted by a hydrogen atom or a halogen atom), $CH_2$=$CFCF_2O[CF(CF_3)CF_2]_nOCF(CF_3)CH_2OR$ (n is an integer of 0 to 10; and R is a hydrogen atom or an alkyl group optionally substituted by a hydrogen atom or a halogen atom), $CH_2$=$CFCF_2O[CF(CF_3)CF_2]_nOCH-FCF_3$ (n is an integer of 0 to 10), and $CH_2$=$CFCF_2O[CF(CF_3)CF_2]_nOCF$=$CF_2$ (n is an integer of 0 to 10).

Examples of the fluoro(meth)acrylic monomer include $CH_2$=$CFCO_2R$ (R is a hydrogen atom or an alkyl group optionally substituted by a hydrogen atom or a halogen atom) and $CH_2$=$C(CF_3)CO_2R$ (R is a hydrogen atom or an alkyl group optionally substituted by a hydrogen atom or a halogen atom).

Examples of the fluorostyrenic monomer include $CH_2$=$CFC_6X_5$(X is H or F) and $CH_2$=$C(CF_3)C_6X_5$ (X is H or F).

Preferable among these fluoromonomers (N) as monomers giving a fluoropolymer having a —$CF_2I$ end or —$CH_2I$ end at either or both ends of its main chain and/or an end of its side chain are vinyl fluoride monomers because they are easily prepared. Also preferable are one of or two or more of fluoroolefinic monomers because the fluoropolymer (A), which is a material of the monomer, is easily prepared.

The structure of the fluoropolymer (A) excluding both end groups may include a structural unit derived from a non-fluoromonomer. Examples of such a non-fluoromonomer include ethylene, propylene, alkyl vinyl ether, isobutylene, 1,3-butadiene, vinyl chloride, vinylidene chloride, 2-chloro-1,3-butadiene, vinyl acetate, vinyl propionate, methyl (meth)acrylate, ethyl (meth)acrylate, propyl (meth)acrylate, butyl (meth)acrylate, hydroxyethyl (meth)acrylate, (meth)acrylic acid, (meth)acrylonitrile, (meth)acrylamide, N-isopropyl (meth)acrylamide, N,N-dimethyl (meth)acrylamide, styrene, p-vinylbenzenesulfonic acid, vinylpyridine, ethylene oxide, and propylene oxide.

The structure of the fluoropolymer (A) excluding both end groups is not particularly limited, and examples thereof include fluoroelastomers, fluororesins, and fluoropolyethers.

Specific examples of the fluoroelastomer include (1) VdF fluoroelastomers, (2) TFE/propylene fluoroelastomers, (3) TFE/propylene/VdF fluoroelastomers, (4) ethylene/HFP fluoroelastomers, (5) ethylene/HFP/VdF fluoroelastomers, (6) ethylene/HFP/TFE fluoroelastomers, (7) fluorosilicone fluoroelastomers, and (8) fluorophosphazene fluoroelastomers. Each of these may be used alone, or may be used in any combination to the extent that the effects of the present invention are not impaired. Preferable among these are VdF fluoroelastomers and TFE/propylene fluoroelastomers because they give good terminal polymerization initiation with dithionites.

Examples of the VdF fluoroelastomer (1) include a VdF/HFP fluoroelastomer, VdF/HFP/TFE fluoroelastomer, VdF/perfluoroalkyl vinyl ether (PAVE)/TFE fluoroelastomer, VdF/PAVE/HFP fluoroelastomer, VdF/CTFE fluoroelastomer, and VdF/CTFE/TFE fluoroelastomer. The VdF fluoroelastomer is preferably one represented by formula (3):

$$-(A1)-(A2)-(B1)- \quad (3)$$

wherein the structural unit A1 is a structural unit derived from vinylidene fluoride (VdF) (a1); the structural unit A2 is a structural unit derived from a fluoroethylenic monomer (a2); and the structural unit $B^1$ is a repeating unit derived from a monomer (b1) which is copolymerizable with the monomer (a1) and the monomer (a2).

Preferable among the VdF fluoroelastomers of formula (3) are those containing 45 to 85 mol % of the structural unit A1 and 55 to 15 mol % of the structural unit A2; and more preferable are those containing 50 to 80 mol % of the structural unit A1 and 50 to 20 mol % of the structural unit A2. The amount of the structural unit B1 is preferably 0 to 10 mol % for the total amount of the structural unit A1 and the structural unit A2.

The fluoroethylenic monomer (a2) may include one monomer or two or more monomers. Examples thereof include fluoromonomers such as tetrafluoroethylene (TFE), chlorotrifluoroethylene (CTFE), trifluoroethylene (TrFE), hexafluoropropylene (HFP), 3,3,3-trifluoropropylene, 2,3,3,3-tetrafluoropropylene, 1,3,3,3-tetrafluoropropylene, 1,2,3,3,3-pentafluoropropylene, trifluorobutene, hexafluoroisobutene, perfluoro(alkyl vinyl ether) (PAVE), and vinyl fluoride. Preferable among these are tetrafluoroethylene, hexafluoropropylene, and perfluoro(alkyl vinyl ether).

The monomer (b1) may be any monomer copolymerizable with the monomer (a1) and the monomer (a2). Examples thereof include ethylene, propylene, and alkyl vinyl ethers.

Preferable combination of the VdF (a1) and the fluoroethylenic monomer (a2) include, specifically, a VdF/HFP elastomer, VdF/HFP/TFE elastomer, VdF/PAVE elastomer, VdF/TFE/PAVE elastomer, VdF/HFP/PAVE elastomer, and VdF/HFP/TFE/PAVE elastomer.

The VdF/HFP elastomer preferably has a VdF/HFP composition of 45 to 85/55 to 15 mol %, and more preferably 50 to 80/50 to 20 mol %.

The VdF/HFP/TFE elastomer preferably has a VdF/HFP/TFE composition of 40 to 80/10 to 35/10 to 35 mol %.

The VdF/PAVE elastomer preferably has a VdF/PAVE composition of 65 to 90/35 to 10 mol %.

The VdF/TFE/PAVE elastomer preferably has a VdF/TFE/PAVE composition of 40 to 80/3 to 40/15 to 35 mol %.

The VdF/HFP/PAVE elastomer preferably has a VdF/HFP/PAVE composition of 65 to 90/3 to 25/3 to 25 mol %.

The VdF/HFP/TFE/PAVE elastomer preferably has a VdF/HFP/TFE/PAVE composition of 40 to 90/0 to 25/0 to 40/3 to 35, and more preferably 40 to 80/3 to 25/3 to 40/3 to 25 mol %.

More preferable examples of these VdF fluoroelastomers specifically include a VdF/HFP elastomer and VdF/HFP/TFE elastomer. Specific examples thereof include vinylidene fluoride polymer chains which are represented by formula (4):

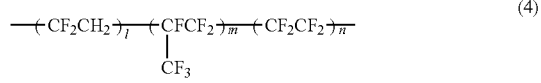

(4)

(wherein, preferably, l is an integer of 7 to 15,000, m is an integer of 0 to 4,900, and n is an integer of 0 to 6,500, and particularly preferably, l is an integer of 8 to 12,000, m is an integer of 0 to 4,900, and n is an integer of 0 to 6,500) in which l, m, and n form an elastomer composition.

The number average molecular weight of the VdF elastomer is preferably 500 or higher, more preferably 1,000 or higher, and further preferably 5,000 or higher. This is because too low a molecular weight tends to cause difficulty in formation of a 3-dimensional network structure by crosslinking and may not give a uniform structural unit of the monomers at the respective ends of the VdF elastomer, thereby causing change in chemical stability. Further, the number average molecular weight of the VdF elastomer is preferably 1,000,000 or lower, and more preferably 300,000 or lower because such a molecular weight causes good solubility to a solvent.

Further, the VdF elastomer used in the present invention preferably has a Mooney viscosity ($ML_{1+10}$ (121° C.)) of 5 to 140, more preferably 10 to 120, and particularly preferably 20 to 100, for good processability.

Specific examples of the fluororesin include (1) polyvinylidene fluoride and copolymers thereof (examples of copolymer components: TFE, CTFE, HFP, TrFE, and perfluoroalkyl vinyl ether), (2) polyvinyl fluoride and copolymers thereof, (3) polychlorotrifluoroethylene and copolymers thereof, (4) polytetrafluoroethylene, (5) TFE/HFP copolymer, (6) TFE/perfluoroalkyl vinyl ether copolymer, (7) TFE/ethylene copolymer, (8) TFE/ethylene/perfluoroalkyl vinyl ether copolymer, (9) TFE/ethylene/HFP copolymer, (8) TFE/propylene copolymer, (9) CTFE/ethylene copolymer, (10) CTFE/propylene copolymer, and (11) TFE/perfluorodimethyldioxole copolymer.

The vinylidene fluoride (VdF) fluororesin (1) is preferably one represented by formula (5):

(5)

wherein the structural unit A3 is a structural unit derived from a vinylidene fluoride (a3); the structural unit A4 is a structural unit derived from a fluoroethylenic monomer (a4); and the structural unit B2 is a repeating unit derived from a monomer (b2) copolymerizable with the monomer (a3) and the monomer (a4).

The VdF fluororesin used in the present invention is preferably a vinylidene fluoride polymer chain represented by formula (4) in which the ratio of l, m, and n are in a ratio of a resin composition.

Further, preferable among the vinylidene fluoride (VdF) fluororesins represented by formula (5) are those containing 86 mol % or more of the structural unit A3 and 14 mol % or less of the structural unit A4.

Examples of the fluoropolyether include those having a repeating unit represented by formula (6):

(6)

wherein $R^8$ is a C1-C6, preferably C1-C3, linear or branched fluoroalkylene group; n is an integer of 1 to 500, preferably 2 to 400, and more preferably 10 to 200.

Examples of the repeating unit ($R^8$—O) of formula (6) include —$CF_2O$—, —$CF_2CF_2O$—, —$CF_2CF_2CF_2O$—, —$CF(CF_3)CF_2O$—, —$CF_2CF_2CF_2CF_2O$—, —$C(CF_3)_2O$—, —$CH_2CF_2CF_2O$—, —$CHFCF_2CF_2O$—, —$CH_2CF_2O$—, —$CHFCF_2O$—, —$CH_2CHFO$—, and —$CHFCHFO$—. Perfluoropolyethers are preferable due to their excellent heat resistance, and the repeating unit ($R^8$—O) is preferably —$CF_2O$—, —$CF_2CF_2O$—, —$CF_2CF_2CF_2O$—, —$CF(CF_3)CF_2O$—, —$CF_2CF_2CF_2CF_2O$—, —$CH_2CF_2CF_2O$—, or —$C(CF_3)_2O$—. The fluoroalkyl ether structure may be formed by one of these repeating units, or may be formed by combination of two or more of these.

In particular, the fluoropolyether chain preferably includes one having a fluoropolyether chain which has at least one constitutional unit selected from the group consisting of —$CF_2O$—, —$CF_2CF_2O$—, —$CF_2CF_2CF_2O$—, —$CF(CF_3)CF_2O$—, —$CH_2CF_2CF_2$—, and —$C(CF_3)_2O$—, and which has a number average molecular weight of 300 to 300,000. Too low a number average molecular weight causes a small fluoropolymer segment in the copolymer to be obtained, and thereby the effects owing to the fluoro segment, such as water repellency, is less likely to be achieved although no trouble occurs in the reactivity from an end group. In contrast, too high a number average molecular weight may cause poor dispersibility in a solvent, and the reactivity of an end group tends to be low. The number average molecular weight is preferably 80,000 or lower, and more preferably 20,000 or lower.

Examples of the fluoroalkyl ether structure include:
a structure represented by formula (7):

$$-(\mathrm{CFOCF_2})_p-(\mathrm{CF_2})_r-(\mathrm{CF_2OCF})_q- \qquad (7)$$
$$\phantom{-(\mathrm{CFOCF_2})_p}|\phantom{-(\mathrm{CF_2})_r-(\mathrm{CF_2OCF})_q-}|$$
$$\phantom{-(\mathrm{CFOCF_2})_p}X^5\phantom{-(\mathrm{CF_2})_r-(\mathrm{CF_2OCF})_q-}X^5$$

wherein $X^5$ is a fluorine atom or $-CF_3$; and p, q, and r each are an integer satisfying $p\geq 1$, $q\geq 1$, $2\leq p+q\leq 200$, particularly $2\leq p+q\leq 110$, and $0\leq r\leq 6$;

a structure represented by formula (8):

$$-CF_2CF_2OCF_2-(CFOCF_2)_r-(CF_2)_s-(CF_2OCF)_t-CF_2OCF_2CF_2- \qquad (8)$$
$$\phantom{-CF_2CF_2OCF_2-(}|\phantom{CFOCF_2)_r-(CF_2)_s-(CF_2OCF)_t}|$$
$$\phantom{-CF_2CF_2OCF_2-(}CF_3\phantom{OCF_2)_r-(CF_2)_s-(CF_2OCF)}CF_3$$

wherein r, s, and t are integers satisfying $0\leq r\leq 6$, $s\geq 0$, $t\geq 0$, and $0\leq s+t\leq 200$, particularly $2\leq s+t\leq 110$;

a structure represented by formula (9):

$$-CF-(OCFCF_2)_u-(OCF)_v-OCF- \qquad (9)$$
$$\phantom{-C}|\phantom{F-(O}|\phantom{CFCF_2)_u-(O}|$$
$$\phantom{-C}X^6\phantom{F-(}X^6\phantom{CFCF_2)_u-(O}X^6$$

wherein $X^6$ is a fluorine atom or $-CF_3$; and u and v are integers satisfying $1\leq u\leq 100$ and $1\leq v\leq 50$; and a structure represented by formula (10):

$$-CF_3CF_2-(OCF_2CF_2CF_2)_w-OCF_2CF_2- \qquad (10)$$

wherein w is an integer satisfying $1\leq w\leq 100$.

The method for producing a VdF elastomer having the end group of formula (1) is particularly preferably a known iodine-transfer polymerization method because a polymer to be obtained has a narrow molecular weight distribution and the molecular weight thereof is easily controlled. Further, the iodine-transfer polymerization enables easy introduction of an iodine atom to an end.

Examples of the iodine-transfer polymerization include a method in which an iodine and/or bromine compound, preferably in the presence of a diiodine and/or dibromine compound, a monomer constituting the fluoropolymer and, if necessary, a monomer giving a cross-linking site, are emulsion-polymerized or solution-polymerized in an aqueous medium under pressure under stirring in the presence of a radical initiator under substantially no oxygen.

Typical examples of the iodine or bromine compound to be used include a compound represented by formula (11):

$$R^7I_xBr_y \qquad (11)$$

wherein x and y each are an integer of 0 to 2 and they satisfy $1\leq x+y\leq 2$; $R^7$ is a C1-C8 saturated or unsaturated fluorohydrocarbon or chlorofluorohydrocarbon group, or a C1-C3 hydrocarbon group, optionally containing an oxygen atom. An iodine atom or a bromine atom is introduced into an end of a fluoropolymer obtainable from such an iodine compound (for example, see JP 53-125491 A and JP 63-304009 A).

A chain transfer agent to be used may be an iodine compound and/or bromide of alkali or alkaline earth metals in JP 3-52907 A. In relation to the chain transfer agents containing iodine and/or bromine, chain transfer agents known in the conventional techniques, such as ethyl acetate and diethyl malonate, may also be used.

The sulfur compound (C) used as a one-electron reducing agent in the production method of the present invention is a dithionite represented by formula (2):

$$(Y^1)_nH_mS_2O_4 \qquad (2)$$

wherein $Y^1$ is a monovalent metal ion or an ammonium ion, n is 1 and m is 1;
$Y^1$ is a monovalent metal ion or an ammonium ion, n is 2 and m is 0; or
$Y^1$ is a divalent metal ion, n is 1 and m is 0.

Examples of the monovalent or divalent metal ion $Y^1$ include alkali metal ions such as $Li^+$, $Na^+$, and $K^+$; alkaline earth metal ions such as $Mg^{2+}$ and $Ca^{2+}$; $Zn^{2+}$; and $NH_4^+$.

Specific examples of the compound of formula (2) include: monovalent metal salts such as $Na_2S_2O_4$, $K_2S_2O_4$, $Li_2S_2O_4$, $NaHS_2O_4$, $KHS_2O_4$, and $LiHS_2O_4$; divalent metal salts such as $ZnS_2O_4$, $MgS_2O_4$, and $CaS_2O_4$; and ammonium salts such as $(NH_4)_2S_2O_4$ and $(NH_4)HS_2O_4$.

The radical polymerizable monomer (M) to be copolymerized in the present invention is not particularly limited as long as it has a radical polymerizable group and it is different from the fluoromonomer (N) giving a structural unit of the fluoropolymer (A). It may include one of or two or more of monomers such as a vinyl fluoride monomer, non-fluoro ethylenic monomer, (meth)acrylic monomer, styrenic monomer, vinyl etheric monomer, and vinyl ester monomer.

The vinyl fluoride monomer may include one of or two or more of the following, for example:
fluoroolefins such as $CF_2=CF_2$, $CF_2=CFCF_3$, $CF_2=CFCl$, $CF_2=CFH$, $CH_2=CF_2$, $CH_2=CHF$, and $CH_2=CFCF_3$;
fluorovinyl ethers such as $CF_2=CFO(CF_2)_nF$ (n is an integer of 1 to 10), perfluorobutenyl vinyl ether, perfluoroallyl vinyl ether, perfluoro-2,2-dimethyldioxole, and perfluorodioxole; and
fluoroallyl ethers such as $CH_2=CFCF_2O[CF(CF_3)CF_2]_nOCF(CF_3)COOR$ (n is an integer of 0 to 10; R is a hydrogen atom or an alkyl group optionally substituted by a hydrogen atom or a halogen atom), $CH_2=CFCF_2O[CF(CF_3)CF_2]_nOCF(CF_3)CH_2OR$ (n is an integer of 0 to 10; R is a hydrogen atom or an alkyl group optionally substituted by a hydrogen atom or a halogen atom), $CH_2=CFCF_2O[CF(CF_3)CF_2]_nOCHFCF_3$ (n is an integer of 0 to 10), and $CH_2=CFCF_2O[CF(CF_3)CF_2]_nOCF=CF_2$ (n is an integer of 0 to 10).

The non-fluoro ethylenic monomer may include one of or two or more of the following, for example: $CH_2=CH_2$, $CH_2=CH(CH_3)$, $CH_2=C(CH_3)_2$, $CH_2=CH-CH=CH_2$, $CH_2=C(CH_3)CH=CH_2$, $CH_2=CHCl$, $CH_2=CCl_2$, and $CH_2=CCl-CH=CH_2$.

The (meth)acrylic monomer may include one of or two or more of the following, for example:
(meth)acrylic acid ester monomers such as $CH_2=CHCOOR$ (R is a hydrogen atom or a C1-C10 alkyl group optionally substituted by a halogen atom), $CH_2=C(CH_3)COOR$ (R is a hydrogen atom or a C1-C10 alkyl group optionally substituted by a halogen atom), $CH_2=CFCOOR$ (R is a hydrogen atom or a C1-C10 alkyl group optionally substituted by a halogen atom), and $CH_2=C(CF_3)COOR$ (R is a hydrogen atom or a C1-C10 alkyl group optionally substituted by a halogen atom);
(meth)acrylic acid hydroxyester monomers such as $CH_2=CHCOO-R-OH$ (R is a C1-C10 divalent alkylene group optionally substituted by a halogen atom), $CH_2=C(CH_3)COO—R—OH$ (R is a C1-C10 divalent alkylene group optionally substituted by a halogen atom), $CH_2=CFCOO—R—OH$ (R is a C1-C10 divalent alkylene group optionally substituted by a halogen atom), and $CH_2=C(CF_3)COO—R—OH$ (R is a C1-C10 divalent alkylene group optionally substituted by a halogen atom);

(meth)acrylamides such as $CH_2=CHCONR^1R^2$ ($R^1$ and $R^2$ may be the same as or different from each other, and they each are a hydrogen atom or a C1-C10 alkyl group optionally substituted by a halogen atom), $CH_2=C(CH_3)CONR^1R^2$ ($R^1$ and $R^2$ may be the same as or different from each other, and they each are a hydrogen atom or a C1-C10 alkyl group optionally substituted by a halogen atom), $CH_2=CFCONR^1R^2$ ($R^1$ and $R^2$ may be the same as or different from each other, and they each are a hydrogen atom or a C1-C10 alkyl group optionally substituted by a halogen atom), and $CH_2=C(CF_3)CONR^1R^2$ ($R^1$ and $R^2$ may be the same as or different from each other, and they each are a hydrogen atom or a C1-C10 alkyl group optionally substituted by a halogen atom);

vinyl ketones such as $CH_2=CHCOR$ (R is a hydrogen atom or a C1-C10 alkyl group optionally substituted by a halogen atom), $CH_2=C(CH_3)COR$ (R is a hydrogen atom or a C1-C10 alkyl group optionally substituted by a halogen atom), $CH_2=CFCOR$ (R is a hydrogen atom or a C1-C10 alkyl group optionally substituted by a halogen atom), and $CH_2=C(CF_3)COR$ (R is a hydrogen atom or a C1-C10 alkyl group optionally substituted by a halogen atom); and (meth)acrylonitriles such as $CH_2=CHCN$, $CH_2=C(CH_3)CN$, $CH_2=CFCN$, and $CH_2=C(CF_3)CN$.

The styrenic monomer may include one or two or more of the following, for example: $CH_2=CHC_6X_5$ (X is H or F), $CH_2=C(CH_3)C_6X_5$ (X is H or F), $CH_2=CFC_6X_5$ (X is H or F), $CH_2=C(CF_3)C_6X_5$ (X is H or F), $CH_2=CHC_6X_4—SO_3H$ (X is H or F), $CH_2=C(CH_3)C_6X_4—SO_3H$ (X is H or F), $CH_2=CFC_6X_4—SO_3H$ (X is H or F), $CH_2=C(CF_3)C_6X_4—SO_3H$ (X is H or F), $CH_2=CHC_6X_4—OH$ (X is H or F), $CH_2=C(CH_3)C_6X_4—OH$ (X is H or F), $CH_2=CFC_6X_4—OH$ (X is H or F), and $CH_2=C(CF_3)C_6X_4—OH$ (X is H or F).

The vinyl etheric monomer may include one of or two or more of the following, for example: $CH_2=CHOR$ (R is an alkyl group optionally substituted by a halogen atom).

The vinyl ester monomer may include one of or two or more of the following, for example: $CH_2=CHOCO_2R$ (R is an alkyl group optionally substituted by a halogen atom).

The amount of the sulfur compound (C) is preferably 1 equivalent or more, and more preferably 5 equivalents or more, for each end group of the polymer (A), in consideration of inhibition of the reactivity of the polymer (A) by steric hindrance and the neighboring group effect and reduction in diffusion of the sulfur compound. Also, the amount of the sulfur compound is preferably 500 equivalents or less, more preferably 100 equivalents or less, and further preferably 30 equivalents or less, for each end group of the polymer (A), so as not to allow a low-molecular-weight sulfur compound derived from the sulfur compound used here to remain in a large amount in the block copolymer to be obtained.

Since the block copolymerization reaction does not become slow even at low temperatures, the reaction temperature may be −50° C. or higher, and is preferably −20° C. or higher. Since a side reaction due to the sulfur compound (C) proceeds at high temperatures, the reaction temperature is preferably 150° C. or lower, and more preferably 100° C. or lower.

The reaction time of the block copolymerization reaction may be appropriately adjusted depending on the type of end groups, polymerizability of monomers, and reaction temperature. If the reaction time is too short, the block chain cannot have a sufficient molecular weight. Thus, the reaction time is preferably 0.5 hours or longer, and more preferably 1 hour or longer. In contrast, too long a reaction time may cause a side reaction due to the sulfur compound (C) and low productivity of the block copolymer. Thus, the reaction time is preferably 100 hours or shorter, and more preferably 60 hours or shorter.

Examples of a solvent to be used in block copolymerization reaction include dimethyl sulfoxide (DMSO), sulfolane, dimethyl sulfone, dimethyl sulfate, diethyl sulfate, acetonitrile, acetone, 4-methylpentan-2-one, 2-butanone, 2-pentanone, methanol, ethanol, 1-propanol, 2-propanol, 1-butanol, 2-butanol, 2-methyl-1-propanol, 2-methyl-2-propanol, methyl acetate, ethyl acetate, propyl acetate, butyl acetate, methyl butyrate, ethyl butyrate, butyl butyrate, methyl lactate, ethyl lactate, methyl formate, ethyl formate, propyl formate, γ-butyrolactone, ethylene carbonate, propylene carbonate, dimethyl carbonate, diethyl carbonate, 4-methylpentan-2-one, 2-butanone, nitromethane, N,N-dimethyl formamide, N,N-dimethyl acetamide, N-methyl pyrrolidone, tetrahydrofuran, t-butyl methyl ether, diethyl ether, diisopropyl ether, dibutyl ether, dioxane, dimethoxymethane, 1,2-dimethoxyethane, ethylene glycol dimethyl ether, ethylene glycol diethyl ether, diethylene glycol dimethyl ether, triethylene glycol dimethyl ether, tetraethylene glycol dimethyl ether, dichloropentafluoropropane (HCFC-225), 1,1-dichlorofluoroethane (HCFC-141b), 1,1,2-trichlorotrifluoroethane (CFC-113), tetrachlorohexafluorobutane, dichlorooctafluorobutane, pentachloropentafluorohexane, dibromotetrafluoroethane, perfluorohexane, hexafluoro-2-propanol, trifluoroethanol, and 2,2,3,3-tetrafluoropropanol. The solvent may be a mixed solvent of any of these organic solvents and water.

The polymer segment (B) of the radical polymerizable monomer (M) formed by block copolymerization of the radical polymerizable monomer (M) depends on the polymerizability of the radical polymerizable monomer (M). The number average molecular weight of the polymer segment (B) may be appropriately adjusted within 100 to 10,000,000, and further within 1,000 to 1,000,000.

In the production method of the present invention, the reaction of the radical polymerizable monomer (M) to the iodine ends of the polymer (A) proceeds at almost 100%. Thus, the polymer segment (B) of the radical polymerizable monomer (M) grows from every iodine end of the polymer (A).

In the case that the polymer (A) has one iodine end, for example, the block copolymer to be obtained is an A-B type diblock copolymer. In the case that the polymer (A) has iodine ends at both ends, the block copolymer to be obtained is a B-A-B type diblock copolymer.

EXAMPLES

The following will describe the present invention in detail referring to, but not limited to, examples.

The respective analyses and measurements in the present invention were performed in accordance with the following methods.

(1) NMR: JEOL Ltd. (NM-Excalibur 500)
$^1$H-NMR measurement conditions: 500 MHz (tetramethylsilane=0 ppm)
$^{19}$F-NMR measurement conditions: 500 MHz (trichlorofluoromethane=0 ppm)
(2) Gel Permeation Chromatography (GPC)

The number average molecular weight is calculated based on the data measured by gel permeation chromatography (GPC) using GPC HLC-8020 (TOSOH CORPORATION), columns (one piece of GPC KF-801, one piece of GPC KF-802, and two pieces of GPC KF-806M connected in series, Shodex), and tetrahydrofuran (THF) as a solvent at a flow rate of 1 ml/min, in terms of polystyrene standard. In this GPC measurement, the measurement error in the molecular weight in terms of polystyrene standard is about ±300.

Production Example 1

Method for Producing VdF/HFP Copolymer Elastomer Having —CH$_2$I at Both Ends of its Main Chain A 3-L autoclave was charged with pure water (1,500 g), 20% by weight of ammonium perfluoroactanoate aqueous solution (22 g). The air inside the system was replaced with nitrogen gas and the pressure inside the system was reduced. Then, the internal temperature was heated up to 80° C., HFP was supplied thereto until the internal pressure reached 0.73 MPa, and VdF was further supplied thereto until the internal pressure reached 1.5 MPa. Thereafter, 1,4-diiodooctafluorobutane (12.6 g, 27.8 mmol), and ammonium persulfate (APS) (40 mg) dissolved in water (8 g) were added under stirring, so that polymerization was initiated. The polymerization pressure was 1.5 MPa, and a VdF/HFP mixed monomer (VdF/HFP=78/22 (mol %), 417 g) was continuously supplied. In the middle of the reaction, APS (66 mg), APS (80 mg), and APS (96 mg), each dissolved in water (8 g), were put into the system after 2 hours, 4 hours, and 7 hours from the polymerization initiation, respectively. The reaction time was 10 hours. The amount of the obtained emulsion was 1,900 g, and the polymer concentration thereof was 20% by weight.

This emulsion was coagulated in an aqueous solution of aluminum sulfate, and then washed with hot water. Thereby, a VdF/HFP copolymer having —CH$_2$I at both ends of its main chain was obtained. The copolymer composition ratio of the obtained VdF/HFP copolymer was VdF/HFP=78/22 (mol %) in the $^{19}$F-NMR measurement. Further, the number average molecular weight was 19,400 in the GPC measurement in terms of polystyrene standard.

Production Example 2

Production of Perfluoropolyether (PFPE) Having —CF$_2$I at One End of its Main Chain A 1-L four-neck flask was charged with 1 M potassium hydroxide aqueous solution (80 mL, 80 mmol) and hexafluorotetrachlorobutane (100 mL), and they were stirred. F(CF$_2$CF$_2$CF$_2$O)$_n$CF$_2$CF$_2$COOH (average number of n=23, Mn=3,980, 180 g, 45 mmol) was added thereto and a potassium salt thereof was prepared. The potassium salt was dried to be granulated at 100° C. under vacuum, and then dispersed into hexafluorotetrachlorobutane (600 mL) under nitrogen atmosphere. Then, iodine (100 g, 390 mmol) was added. The mixture was heated up to 200° C. and the reaction proceeded for 1.5 hours.

The precipitate was filtered, and hexafluorotetrachlorobutane was distilled off. Thereby, F(CF$_2$CF$_2$CF$_2$O)$_n$CF$_2$CF$_2$I (160 g) having —CF$_2$I at one end of its main chain was obtained.

The number average molecular weight was 4,060 and the average number of n was 23 in the $^{19}$F-NMR end-group determination.

Production Example 3

Method for Producing TFE/PPVE Copolymer Resin Having —CF$_2$I at One End of its Main Chain and —CH$_2$I at End of its Side Chain A 1-L autoclave was charged with HCFC-141b (500 g) and 1-iodoperfluorobutane (3.80 g, 11 mmol), and they were cooled down to −78° C. The system was degassed under vacuum, and perfluoropropyl vinyl ether (PPVE) (106 g, 0.40 mol) and CF$_2$=CFOCF$_2$CF$_2$CH$_2$I (33.8 g, 0.10 mol) were supplied. Then, TFE (50.0 g, 0.50 mol) was introduced. Thereafter, 4,4'-bis(t-butylcyclohexyl)peroxydicarbonate (0.88 g, 2.2 mol) was added using HCFC-141b (20 g), and the system was heated up to 40° C. and the mixture was stirred for 10 hours. After the reaction, the polymerization solution was concentrated under reduced pressure. Hexane was added thereto and the polymer was separated, and then the polymer was dried. Thereby, a TFE/PPVE copolymer (31 g) having —CF$_2$I at one end of its main chain and —CH$_2$I at an end of its side chain was obtained. The copolymer composition ratio of the obtained TFE/PPVE copolymer was TFE/PPVE/CF$_2$=CFOCF$_2$CF$_2$CH$_2$I=79/17/4 (mol %) in the $^1$H-NMR and $^{19}$F-NMR measurements. Further, the number average molecular weight was 2,700 in the $^{19}$F-NMR end-group determination.

Production Example 4

Method for Producing VdF/TFE Copolymer Resin Having —CH$_2$I at Both Ends of its Main Chain A 6-L autoclave was charged with pure water (1,900 g). The air inside the system was replaced with nitrogen gas and the pressure inside the system was reduced. Then, octafluorocyclobutane (1,800 g) was supplied. The internal temperature was heated up to 80° C., and a VdF/TFE mixed monomer (VdF/TFE=76/24 (mol %)) was supplied thereto until the internal pressure reached 1.5 MPa. Thereafter, 1,4-diiodooctafluorobutane (6.3 g, 13.9 mmol) and ammonium persulfate (APS) (20 mg) dissolved in water (8 g) were added under stirring, and polymerization was initiated. The polymerization pressure was 1.5 MPa, and a VdF/TFE mixed monomer (VdF/HFP=76/24 (mol %), 296 g in total) was continuously supplied. In the middle of the reaction, APS (33 mg), APS (33 mg), and APS (66 mg), each dissolved in water (8 g), were put into the system after 2 hours, 4 hours, and 7 hours from the polymerization initiation, respectively. The reaction time was 20 hours. After the reaction, the octafluorocyclobutane was removed from the system, and the polymer was washed with water. Thereby, a VdF/TFE copolymer having —CH$_2$I at both ends of its main chain was obtained. The copolymer composition ratio of the obtained VdF/TFE copolymer was VdF/TFE=67/33 (mol %) in the $^{19}$F-NMR measurement. Further, the number average molecular weight was 20,400 in the GPC measurement in terms of polystyrene standard.

Production Example 5

Production of Perfluoropolyether (PHFPO) Having —$CF(CF_3)Br$ at One and of its Main Chain A 1-L four-neck flask was charged with 1 M potassium hydroxide aqueous solution (48 mL, 48 mmol) and hexafluorotetrachlorobutane (60 mL), and they were stirred. $F[CF(CF_3)CF_2O]_nCF(CF_3)COOH$ (average number of n=10, Mn=1,820, 50 g, 27 mmol) was added, and a potassium salt thereof was prepared. The potassium salt was dried to be granulated at 100° C. under vacuum, and then dispersed into hexafluorotetrachlorobutane (300 mL) under nitrogen atmosphere. Then, bromine (37 g, 233 mmol) was added. The mixture was heated up to 150° C., and the reaction proceeded for 6 hours.

The precipitate was filtered, and the hexafluorotetrachlorobutane was distilled off. Thereby, a $F[CF(CF_3)CF_2O]_nCF(CF_3)Br$ (44 g) having —$CF(CF_3)Br$ at one end of its main chain was obtained.

The number average molecular weight was 1,860 and the average number of n was 10 in the $^{19}F$-NMR end-group determination.

Example 1

Method for Producing a BAB-Block Copolymer of VdF/HFP Copolymer-Polymethyl Methacrylate A 20-mL flask was charged with the VdF/HFP copolymer (Mn=19,400, 0.50 g, 26 μmol) having —$CH_2I$ at both ends of its main chain produced in Production Example 1. Dimethyl sulfoxide (5 mL) was added thereto, and the mixture was stirred for 6 hours. Then, methyl methacrylate (0.50 g, 5.0 mmol) was added to the reaction system and $Na_2S_2O_4$ (46 mg, 0.26 mmol) was further added thereto. The mixture was stirred at 50° C. for 12 hours under argon atmosphere.

The reaction solution was poured into ethyl acetate (100 mL), and water (100 mL) was added thereto so that the solution was separated. The organic layer was isolated and washed with saturated aqueous NaCl (100 mL). The organic layer was dried over $MgSO_4$, and the solvent was distilled off under reduced pressure.

The $^1H$-NMR and $^{19}F$-NMR measurements showed that the product contained both polymer segments. Further, the obtained block copolymer contained no methacrylate homopolymer and showed a single peak in the GPC measurement. The number average molecular weight was 34,600.

Example 2

Method for Producing a BAB-Block Copolymer of VdF/HFP Copolymer-Polymethyl Methacrylate A 20-mL flask was charged with the VdF/HFP copolymer (Mn=19,400, 0.25 g, 13 μmol) having —$CH_2I$ at both ends of its main chain produced in Production Example 1. Dimethyl sulfoxide (5 mL) was added thereto, and the mixture was stirred for 6 hours. Then, methyl methacrylate (1.0 g, 10 mmol) was added to the reaction system and further $Na_2S_2O_4$ (22 mg, 0.13 mmol) was added thereto. The mixture was stirred at 50° C. for 12 hours under argon atmosphere.

The reaction solution was poured into ethyl acetate (100 mL), and water (100 mL) was added thereto so that the solution was separated. The organic layer was isolated and washed with saturated aqueous NaCl (100 mL). The organic layer was dried over $MgSO_4$, and the solvent was distilled off under reduced pressure.

The $^1H$-NMR and $^{19}F$-NMR measurements showed that the product contained both polymer segments. Further, the obtained block copolymer contained no methyl methacrylate homopolymer and showed a single peak in the GPC measurement. The number average molecular weight was 48,900.

Example 3

Method for Producing BAB-Block Copolymer of VdF/HFP Copolymer-Polystyrene

A 20-mL flask was charged with the VdF/HFP copolymer (Mn=19,400, 0.50 g, 26 μmol) having —$CH_2I$ at both ends of its main chain produced in Production Example 1. Dimethyl sulfoxide (5 mL) was added thereto, and the mixture was stirred for 6 hours. Thereafter, styrene (0.50 g, 4.8 mmol) was added to the reaction system, and further $Na_2S_2O_4$ (46 mg, 0.26 mmol) was added thereto. The mixture was stirred at 50° C. for 12 hours under argon atmosphere.

The reaction solution was poured into ethyl acetate (100 mL), and water (100 mL) was added thereto so that the solution was separated. The organic layer was isolated and washed with saturated aqueous NaCl (100 mL). The organic layer was dried over $MgSO_4$, and the solvent was distilled off under reduced pressure.

The 1H-NMR and $^{19}F$-NMR measurements showed that the product contained both polymer segments. The obtained VdF/HFP copolymer contained no styrene homopolymer and showed a single peak in the GPC measurement. The number average molecular weight was 41,800.

Example 4

Method for Producing BAB-Block Copolymer of VdF/HFP Copolymer-Vinyl Acetate

A 20-mL flask was charged with the VdF/HFP copolymer (Mn=19,400, 0.50 g, 26 μmol) having —$CH_2I$ at both ends of its main chain produced in Production Example 1. Dimethyl sulfoxide (5 mL) was added thereto, and the mixture was stirred for 6 hours. Thereafter, vinyl acetate (0.50 g, 5.8 mmol) was added to the reaction system, and $Na_2S_2O_4$ (46 mg, 0.26 mmol) was further added thereto. The mixture was stirred at 50° C. for 12 hours under argon atmosphere.

The reaction solution was poured into ethyl acetate (100 mL), and water (100 mL) was added thereto so that the solution was separated. The organic layer was isolated and washed with saturated aqueous NaCl (100 mL). The organic layer was dried over $MgSO_4$, and the solvent was distilled off under reduced pressure.

The $^1H$-NMR and $^{19}F$-NMR measurements showed that the product contained both polymer segments. The obtained block copolymer contained no vinyl acetate homopolymer and showed a single peak in the GPC measurement. The number average molecular weight was 60,700.

Example 5

Method for Producing BAB-Block Copolymer of VdF/HFP Copolymer and $CH_2=CFCF_2OR$ A 20-mL flask was charged with the VdF/HFP copolymer (Mn=19,400, 0.50 g, 26 μml) having —$CH_2I$ at both ends of its main chain produced in Production Example 1. Dimethyl sulfoxide (5 mL) was added thereto, and the mixture was stirred for 6 hours. Thereafter, $CH_2=CFCF_2OCF(CF_3)$ $CH_2OH$ (0.50 g, 1.2 mmol) was added to the reaction system, and further $Na_2S_2O_4$ (46 mg, 0.26 mmol) was added thereto. The mixture was stirred at 50° C. for 12 hours under argon atmosphere.

The reaction solution was poured into ethyl acetate (100 mL), and water (100 mL) was added thereto so that the solution was separated. The organic layer was isolated and washed with saturated aqueous NaCl (100 mL). The organic layer was dried over $MgSO_4$, and the solvent was distilled off under reduced pressure.

The $^1$H-NMR and $^{19}$F-NMR measurements showed that the product contained both polymer segments. The obtained block copolymer contained no $CH_2=CFCF_2OCF(CF_3)$ $CH_2OH$ homopolymer and showed a single peak in the GPC measurement. The number average molecular weight was 39,300.

Example 6

Production Method of AB-Block Copolymer of PFPE-Polyacrylonitrile

A 20-mL flask was charged with perfluoropolyether (PFPE) (Mn=4,060, 0.25 g, 62 μmol) having —$CF_2I$ at one end of its main chain produced in Production Example 2. Dimethyl sulfoxide (5 mL) was added thereto, and the mixture was stirred for 6 hours. Thereafter, acrylonitrile (1.00 g, 19 mmol) was added to the reaction system, and $Na_2S_2O_4$ (54 mg, 0.31 mmol) was further added thereto. The mixture was stirred at 50° C. for 12 hours under argon atmosphere.

The reaction solution was poured into ethyl acetate (100 mL), and water (100 mL) was added thereto so that the solution was separated. The organic layer was isolated and washed with saturated aqueous NaCl (100 mL). The organic layer was dried over $MgSO_4$, and the solvent was distilled off under reduced pressure.

The $^1$H-NMR and $^{19}$F-NMR measurements showed that the product contained both polymer segments. The obtained block copolymer contained no acrylonitrile homopolymer and showed a single peak in the GPC measurement. The number average molecular weight was 24,100.

Example 7

Method for Producing AB-Block+Grafted Copolymer of TFE/PPVE Copolymer-Polyvinyl Chloride A 100-mL autoclave was charged with the TFE/PPVE copolymer (Mn=2700, 0.25 g, 93 μmol) having —$CF_2I$ at one end of its main chain and —$CH_2I$ at an end of its side chain produced in Production Example 3. Dimethyl sulfoxide (30 mL) and $Na_2S_2O_4$ (0.14 g, 0.79 mmol) were added thereto, and the air inside the system was replaced with nitrogen at 0° C. Thereafter, vinyl chloride (2.0 g, 32 mmol) was added, and the mixture was stirred at 50° C. for 24 hours.

The reaction solution was poured into ethyl acetate (100 mL), and water (100 mL) was added thereto so that the solution was separated. The organic layer was isolated and washed with saturated aqueous NaCl (100 mL). The organic layer was dried over $MgSO_4$, and the solvent was distilled off under reduced pressure.

The $^1$H-NMR and $^{19}$F-NMR measurements showed that the product contained both polymer segments. The obtained block copolymer contained no vinyl chloride homopolymer and showed a single peak in the GPC measurement. The number average molecular weight was 19,500.

Example 8

Method for Producing AB-Block Copolymer of $CF_3(CF_2CF_2)_4CF_2$ and BMA/HEMA Copolymer A 20-mL flask was charged with $CF_3(CF_2CF_2)_4CF_2I$ (50 mg, 77 μmol) as a TFE resin. Then, water (5 mL), butyl methacrylate (BMA) (10 g, 70 mmol), and 2-hydroxyethyl methacrylate (HEMA) (1.0 g, 7.6 mmol) was added, and $Na_2S_2O_4$ (134 mg, 0.77 mmol) was further added thereto. The mixture was stirred at 50° C. for 12 hours under argon atmosphere.

The reaction solution was poured into ethyl acetate (100 mL), and water (100 mL) was added thereto so that the solution was separated. The organic layer was isolated and washed with saturated aqueous NaCl (100 mL). The organic layer was dried over $MgSO_4$, and the solvent was distilled off under reduced pressure.

The $^1$H-NMR and $^{19}$F-NMR measurements showed that the product contained both polymer segments. The ratio between butyl methacrylate and 2-hydroxyethyl methacrylate was about 15:1 in the block chain. The obtained copolymer showed a single peak in the GPC measurement. The number average molecular weight was 1,800.

Example 9

Method for Producing BAB-Block Copolymer of VdF/TFE Copolymer-Polymethyl Methacrylate A 20-mL flask was charged with the VdF/TFE copolymer (Mn=20,400, 0.27 g, 13 μmol) having —$CH_2I$ at both ends of its main chain produced in Production Example 4. Dimethyl sulfoxide (5 mL) was added thereto, and the mixture was stirred for 6 hours. Then, methyl methacrylate (1.0 g, 10 mmol) was added to the reaction system and $Na_2S_2O_4$ (22 mg, 0.13 mmol) was further added thereto. The mixture was stirred at 50° C. for 12 hours under argon atmosphere.

The reaction solution was poured into ethyl acetate (100 mL), and water (100 mL) was added thereto so that the solution was separated. The organic layer was isolated and washed with saturated aqueous NaCl (100 mL). The organic layer was dried over $MgSO_4$, and the solvent was distilled off under reduced pressure.

The $^1$H-NMR and $^{19}$F-NMR measurements showed that the product contained both polymer segments. Further, the obtained block copolymer contained no methyl methacrylate homopolymer and showed a single peak in the GPC measurement. The number average molecular weight was 49,900.

Example 10

Method for Producing AB-Block Copolymer of PHFPO-Polyacrylonitrile

A 20-mL flask was charged with the perfluoropolyether (PHFPO) (Mn=1,860, 0.20 g, 108 μmol) having —CF(CF$_3$)Br at one end of its main chain produced in Production Example 5. Dimethyl sulfoxide (5 mL) was added thereto, and the mixture was stirred for 6 hours. Thereafter, acrylonitrile (1.74 g, 33 mmol) was added to the reaction system, and further ZnS$_2$O$_4$ (200 mg, 1.03 mmol) was added thereto. The mixture was stirred at 50° C. for 12 hours under argon atmosphere.

The reaction solution was poured into ethyl acetate (100 mL), and water (100 mL) was added thereto so that the solution was separated. The organic layer was isolated and washed with saturated aqueous NaCl (100 mL). The organic layer was dried over MgSO$_4$, and the solvent was distilled off under reduced pressure.

The $^1$H-NMR and $^{19}$F-NMR measurements showed that the product contained both polymer segments. The obtained block copolymer contained no acrylonitrile homopolymer and showed a single peak in the GPC measurement. The number average molecular weight was 22,100.

Reference Example 1

Determination of Homopolymerizability of Methyl Methacrylate

A 20-mL flask was charged with methyl methacrylate (0.50 g, 5.0 mmol) and dimethyl sulfoxide (5 mL), and further Na$_2$S$_2$O$_4$ (23 mg, 0.13 mmol). The mixture was stirred at 50° C. for 24 hours under argon atmosphere.

The reaction solution was poured into ethyl acetate (100 mL), and water (100 mL) was added thereto so that the solution was separated. The organic layer was isolated and washed with saturated aqueous NaCl (100 mL). The organic layer was dried over MgSO$_4$, and the solvent was distilled off under reduced pressure. In this case, no polymer was produced.

Reference Example 2

Determination of Homopolymerizability of Styrene

A 20-mL flask was charged with styrene (0.52 g, 5.0 mmol) and dimethyl sulfoxide (5 mL), and further Na$_2$S$_2$O$_4$ (23 mg, 0.13 mmol). The mixture was stirred at 50° C. for 24 hours under argon atmosphere.

The reaction solution was poured into ethyl acetate (100 mL), and water (100 mL) was added thereto so that the solution was separated. The organic layer was isolated and washed with saturated aqueous NaCl (100 mL). The organic layer was dried over MgSO$_4$, and the solvent was distilled off under reduced pressure. In this case, no polymer was produced.

The invention claimed is:

1. A method for producing a fluorine-containing block copolymer, comprising
reacting a fluoropolymer (A) having an iodine atom at either or both ends of its main chain and/or an end of its side chain with a radical polymerizable monomer (M) in the presence of a sulfur compound (C) represented by formula (2):

$$(Y^1)_n H_m S_2 O_4 \qquad (2)$$

wherein $Y^1$ is a monovalent metal ion or an ammonium ion, n is 1 and m is 1;
$Y^1$ is a monovalent metal ion or an ammonium ion, n is 2 and m is 0; or
$Y^1$ is a divalent metal ion, n is 1 and m is 0,
said fluoropolymer (A) further having a terminal structure represented by —CH$_2$I and being a fluoropolyether having a repeating unit represented by formula (6):

$$-(R^8-O)_n- \qquad (6)$$

wherein $R^8$ is a C1-C6 linear or branched fluoroalkylene group; n is an integer of 1 to 500.

2. The production method according to claim 1, wherein the fluoropolymer (A), excluding both end groups thereof, has a structure of a fluoropolyether chain which includes at least one structural unit selected from the group consisting of —CF$_2$O—, —CF$_2$CF$_2$O—, —CF$_2$CF$_2$CF$_2$O—, CF(CF$_3$)CF$_2$O—, —CH$_2$CF$_2$CF$_2$O— and —C(CF$_3$)$_2$O— and which has a number average molecular weight of 300 to 300,000.

3. The production method according to claim 1, wherein the radical polymerizable monomer (M) is a monomer which is different from a fluoromonomer (N) giving a structural unit of the fluoropolymer (A) and which is at least one monomer selected from the group consisting of vinyl fluoride monomers, nonfluoro ethylenic monomers, (meth)acrylic monomers, styrenic monomers, vinyl etheric monomers, and vinyl ester monomers.

4. The production method according to claim 1, wherein the sulfur compound (C) is selected from the group consisting of Na$_2$S$_2$O$_4$, K$_2$S$_2$O$_4$, Li$_2$S$_2$O$_4$, NaHS$_2$O$_4$, KHS$_2$O$_4$, LiHS$_2$O$_4$, ZnS$_2$O$_4$, MgS$_2$O$_4$, CaS$_2$O$_4$, (NH$_4$)$_2$S$_2$O$_4$ and (NH$_4$)HS$_2$O$_4$.

* * * * *